US011115666B2

(12) United States Patent
Zavesky et al.

(10) Patent No.: US 11,115,666 B2
(45) Date of Patent: Sep. 7, 2021

(54) SEMANTIC VIDEO ENCODING

(71) Applicant: AT&T Intellectual Property I, L.P., Atlanta, GA (US)

(72) Inventors: Eric Zavesky, Austin, TX (US); Lee Begeja, Gillette, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 190 days.

(21) Appl. No.: 15/668,354

(22) Filed: Aug. 3, 2017

(65) Prior Publication Data
US 2019/0045194 A1 Feb. 7, 2019

(51) Int. Cl.
| | |
|---|---|
| *H04N 19/103* | (2014.01) |
| *H04N 19/142* | (2014.01) |
| *G06K 9/00* | (2006.01) |
| *H04N 19/179* | (2014.01) |
| *H04N 19/154* | (2014.01) |
| *H04N 19/136* | (2014.01) |

(52) U.S. Cl.
CPC ....... *H04N 19/142* (2014.11); *G06K 9/00718* (2013.01); *H04N 19/103* (2014.11); *H04N 19/136* (2014.11); *H04N 19/154* (2014.11); *H04N 19/179* (2014.11)

(58) Field of Classification Search
None
See application file for complete search history.

(56) References Cited

U.S. PATENT DOCUMENTS

| | | | |
|---|---|---|---|
| 6,542,546 B1 | 4/2003 | Vetro et al. | |
| 8,489,627 B1* | 7/2013 | Brandt | G06F 16/532 |
| | | | 707/765 |
| 8,521,541 B2 | 8/2013 | Yi et al. | |
| 8,605,113 B2 | 12/2013 | Chen et al. | |
| 10,474,896 B2* | 11/2019 | Cabral | H04N 19/136 |
| 2002/0024999 A1* | 2/2002 | Yamaguchi | G11B 27/031 |
| | | | 375/240.03 |
| 2005/0203927 A1* | 9/2005 | Sull | G11B 27/034 |
| 2006/0188014 A1 | 8/2006 | Civanlar et al. | |
| 2007/0286286 A1* | 12/2007 | Heng | H04N 19/513 |
| | | | 375/240.16 |
| 2014/0168362 A1 | 6/2014 | Hannuksela et al. | |
| 2014/0269901 A1 | 9/2014 | Shi | |
| 2014/0321561 A1 | 10/2014 | Stec et al. | |
| 2015/0181168 A1 | 6/2015 | Pahalawatta et al. | |

(Continued)

OTHER PUBLICATIONS

A. Yanagawa, S.-F. Chang, L. Kennedy, and W. Hsu "Columbia University's Baseline detectors for 374 LSCOM Semantic Visual Concepts," Columbia University ADVENT Technical Report #222-2006-8, Mar. 20, 2007. (Year: 2007).*

*Primary Examiner* — Shadan E Haghani (57) ABSTRACT

Devices, computer-readable media, and methods for encoding a scene in a video program using an encoding strategy that is selected in accordance with a theme that is identified in the scene are disclosed. For example, a method may include a processing system receiving a video program, identifying boundaries of a scene in the video program, identifying a theme in the scene, and selecting an encoding strategy for the scene based upon the theme, where the encoding strategy is associated with the theme. The processing system may further encode the scene using the encoding strategy that is selected.

20 Claims, 4 Drawing Sheets

(56) References Cited

U.S. PATENT DOCUMENTS

| | | | |
|---|---|---|---|
| 2015/0281709 A1* | 10/2015 | Bracha | H04N 19/36 375/240.26 |
| 2015/0312575 A1 | 10/2015 | Bryant | |
| 2015/0363919 A1* | 12/2015 | Suri | G06T 5/002 382/172 |
| 2016/0134673 A1* | 5/2016 | MacInnis | H04L 65/60 709/231 |
| 2016/0337680 A1* | 11/2016 | Kalagi | H04N 21/2662 |
| 2017/0099485 A1* | 4/2017 | Guerrero | H04N 19/117 |
| 2017/0154415 A1 | 6/2017 | Aydin et al. | |
| 2017/0280166 A1* | 9/2017 | Walkingshaw | H04N 19/86 |
| 2018/0220101 A1* | 8/2018 | Evans | H04N 7/0117 |
| 2019/0034528 A1* | 1/2019 | Lintz | G06F 16/78 |

\* cited by examiner

SEMANTIC VIDEO ENCODING

The present disclosure relates generally to streaming video programs, and more particularly to methods, computer-readable media, and devices for encoding a scene in a video program using an encoding strategy that is selected in accordance with a theme that is identified in the scene.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes a method, computer-readable medium, and device for encoding a scene in a video program using an encoding strategy that is selected in accordance with a theme that is identified in the scene. For instance, in one example, a method may include a processing system receiving a video program, identifying boundaries of a scene in the video program, identifying a theme in the scene, and selecting an encoding strategy for the scene based upon the theme, where the encoding strategy is associated with the theme. The processing system may then encode the scene using the encoding strategy that is selected.

Video encoding techniques may analyze content to be encoded at a granular level. When an image is considered, algorithms may minimize entropy, change, and other statistical properties. Alternatively, subjective human-determined encoding strategies may be deployed based upon operator intuition. For instance, the encoding techniques may be derived manually as specified by other system-level decisions. For instance, an operator may select a different encoding technique for a video program that is intended for playback on high-definition televisions, as compared to a video program that is intended for distribution to and viewing on mobile devices.

In contrast, examples of the present disclosure introduce holistic scene-level views of encoding/compression with the use of semantics (e.g., themes). For instance, examples of the present disclosure may derive or obtain theme models (e.g., classifiers) for a number of themes, analyze incoming video programs to identify themes in the video programs, and tag the video programs with the themes that are identified. Notably, classifiers can be trained from any video or image content to recognize various themes, which may include objects like "car," scenes like "outdoor," and actions or events like "baseball." Similarly, shot and scene detection algorithms may locate and tag shot and/or scene boundaries in a video program. Examples of the present disclosure may further utilize the themes that are identified in various scenes to select encoding strategies for the respective scenes and to encode each for a given bitrate target. In particular, each theme may have an associated encoding strategy that is used to encode scenes that are identified as including the respective theme on a scene-by-scene basis. This replaces a previously static function that would choose encoding parameters for a target stream and maintain the same encoding parameters for the entire video program. Instead, each scene is optimized based on the theme(s) that it contains.

Examples of the present disclosure may further obtain video quality indicators for encoded/compressed scenes, and use the video quality indicators to bias future decisions about what encoding strategies to use and/or to update encoding strategies that are associated with different themes (or groups of themes). For instance, scenes that are encoded may be evaluated automatically or using mean opinion scores, or the like, to obtain video quality indicators for the respective scenes. In addition, in one example, the encoding strategies of various themes may be updated, and the updated encoding strategies may be applied to additional scenes in the same video program or in different video programs that are identified as including the respective themes.

In one example, a theme is a "topic," e.g., a "concept" from a lexical database. For example, the Large Scale Theme Ontology for Multimedia (LSCOM) has hundreds of "themes," such as: "parade," "exiting car," "handshaking," "running," "rocket launching," "barn," "college," "castle," "conference room," "emergency room," "bathroom," "interview on location," "text on artificial background," "ship," "shipyard," "birds," "face," "bicycle," and so on. Other examples include LSCOM-Lite, which has 39 themes, National Institute of Standards and Technology (NIST) Text REtrieval Conference (TREC) Video Retrieval Evaluation (TRECVID) 2016 lexical themes, and the like. In another example, a new lexicon or library of themes may be utilized in connection with examples of the present disclosure. However, the present disclosure may function with any lexicon that is presently available or that is later developed.

Alternatively, or in addition, a theme may correspond to one of several broad categories such as: a type of camera view (e.g., a close up of a face, a close up of a conversation, a room view, a panorama view, an aerial view, or a first person point of view), an audio type (e.g., a narration without music, a narration with music, a conversation with no background noise, a conversation with background noise, quiet music, or loud music), a movement type (e.g., no movement, background movement of non-subjects, subject moving slowly, subject moving quickly, or an action sequence), a setting (e.g., indoor, outdoor urban, outdoor suburban, outdoor wilderness, outdoor rural, on water, underwater, aerial, or space), a subject (e.g., a person, multiple people, an animal, a vehicle, a watercraft, an aircraft, a close up of a face, a close up of a plant, a close up of an animal, a close up of an inanimate object, a building, a landscape feature, a manmade structure, or a room), and so forth.

Theme identification classifiers may include support vector machine (SVM) based or non-SVM based classifiers, such as neural network based classifiers. The classifiers may be trained upon and utilize various data points to recognize themes in scenes. For instance, classifiers may use low-level invariant image data, such as colors, shapes, color moments, color histograms, edge distribution histograms, etc., may utilize speech recognition pre-processing to obtain an audio transcript and to rely upon various keywords or phrases as data points, may utilize text recognition pre-processing to identify keywords or phrases in captioned text as data points, may utilize image salience to determine whether detected objects are "primary" objects of a scene or are less important or background objects, and so forth. In one example, classifiers may be initially trained on a labeled training data set, such as TRECVID training library, or the like.

In one example, the theme that is identified in a scene may comprise a primary theme identified from a number of themes in the scene. For instance, the primary theme may be a theme with a maximal likelihood score of a classifier. For example, a classifier can be a support vector machine (SVM) based or non-SVM based classifier, such as a neural network based classifier. In various examples, the present disclosure may employ a number of single class classifiers, or a multi-class classifier. In the example of SVM based classifiers, the primary theme may be the one having a furthest distance from a separation hyperplane for the respective classifier for the class, and so forth. In another example, the encoding strategy may be selected based upon the plurality of themes that is identified in a scene. For instance, different encoding strategies may be associated with the different themes. However, certain encoding strategies may include parameters which are intended to result in a greater storage utilization (e.g., less compression), and hence greater video quality. In such an example, the encoding strategy may be selected as a composite of parameters from the encoding strategies associated with the respective themes that would result in the greatest storage utilization.

In one example, the encoding strategy may comprise a plurality of parameters, or "factors," of a compression algorithm. In various examples, the compression algorithm could be in accordance with International Telecommunication Union (ITU) Telecommunication Standardization Sector (ITU-T) H.264, H.263, H.261, Moving Picture Experts Group (MPEG)-4, MPEG-2, H.265 High Efficiency Video Coding (HEVC), or the like. Thus, quantization factors that may be adjusted for different encoding strategies for different themes may include: an image salience factor, a color quantization factor, a motion estimation factor, a rate-distortion factor, and so forth. In one example, the encoding strategy may be adjusted when the video quality indicator of the scene indicates a negative perception of a video quality of the scene. For instance, the adjusting may include: increasing the image salience factor, increasing the color quantization factor, e.g., providing for more colors to represent regions of a frame of a video program, decreasing the motion estimation factor, e.g., providing for a greater decoupling between frames of the video program, or increasing the rate-distortion factor, e.g., allocating a greater number of bits to represent a plurality of frames of the video program. Thus, encoding strategies for various themes may be optimized on an ongoing basis in accordance with video quality indicators that are received for scenes containing the theme.

In accordance with the present disclosure, a shot detection program may utilize color histogram differences or a change in color distribution, edge change ratios, standard deviation of pixel intensities, contrast, average brightness, and the like to identify hard cuts, fades, dissolves, etc., which may indicate the end of a shot and the beginning of another shot. In one example, a scene detection program that may be deployed in accordance with the present disclosure may utilize audio and/or text caption data to relate shots together into a scene. In addition, shot and scene detection programs implemented in examples of the present disclosure may also detect shot and scene boundaries utilizing any themes that are identified as defining features of the respective shots and/or scenes. It should be noted that in some cases, a scene may be comprised of a single shot or a plurality of shots. In one example, a shot is broadly interpreted as a sequence of one or more frames of images shot by a camera. As such, in one example, the present disclosure may omit grouping multiple shots together into a scene. In addition, if a scene detection program fails to properly group shots into a scene, the various other operations of the present disclosure may still be applied without loss of function. In other words, the shots will be encoded/compressed as separate scenes based upon the theme(s) identified in the respective shots without any detrimental effect upon additional operations, in accordance with the present disclosure.

In accordance with the present disclosure, a video quality indicator (and a negative perception) could be mean opinion score (MOS) based, where for example, scenes of video programs may be rated using video quality indicators on a 1-5 scale, with 1 being the highest quality rating and 5 being the lowest, and where any MOS rating of 3-5 may be considered a negative score. It should be noted that in other examples, any other scale may be used, e.g., 1-10, 1-100, etc. In addition, scenes may be scored with respect to a number of criteria, such as image clarity, color vividness, audio quality, etc., where a negative score in any category may be taken as an indication of negative perception, or where the scores of respective categories may be averaged to provide an average score from which a negative perception may be determined.

In another example, a video quality indicator (and a negative perception) may be determined via an automated algorithm, such as when a video quality indicator (e.g., a score) is below a pre-defined threshold. For instance, a video quality indicator may be determined in accordance with MOAVI (Monitoring Of Audiovisual Quality by Key Indicators) group of the Video Quality Experts Group (VQEG) established criteria such as measurements of: commercial black, blockiness, block loss, blur, contrast, exposure, flickering, freezing, interlacing, letter-boxing, noise, pillar-boxing, slicing, spatial activity, temporal activity, and so forth. In another example, the video quality indicator may be determined in accordance with ITU-T recommendation J.341, recommendation J.342, or a similar framework for the use of criteria/indicators by automated programs to determine a video quality indicator. In still another example, a video quality indicator (and a negative perception) of a scene may be based upon a composite of MOS and automated algorithm based factors.

In one example, a video program (and scenes within the video program) may be encoded for multiple target bitrates. As such, examples of the present disclosure may maintain multiple encoding strategies per theme (e.g., one set of encoding parameters for each target bitrate) and may obtain video quality indicators for different bitrates. In one example, thresholds for negative feedback and for adjusting encoding strategies may be different for different target bitrates. In addition, for lower bitrates, there may be an upper (or lower) limit to some encoding parameters so that the target bitrate is not exceeded. For example, a service provider may specify a desire to hit a target bitrate. In this case, an encoder may utilize a limit, such as a max of 100 Mb per stream, and then adjust the scene-based encoding parameters to fit. In still another example, a content creator or service provider may identify portions of a video as having a particular importance, such as a high-quality action scene. In one example, the pre-specified importance may be mapped to encoding strategies that include parameters which are intended to result in a greater storage utilization (e.g., less compression), and hence greater video quality. This may override any particular encoding strategies that may be selected based upon the theme(s) identified in a scene, or may dictate the target bitrate (e.g., a higher target bitrate than might otherwise have been implemented based upon the theme detection). These and other aspects of the present disclosure are described in greater detail below in connection with the examples of FIGS. 1-4.

Figure 1:
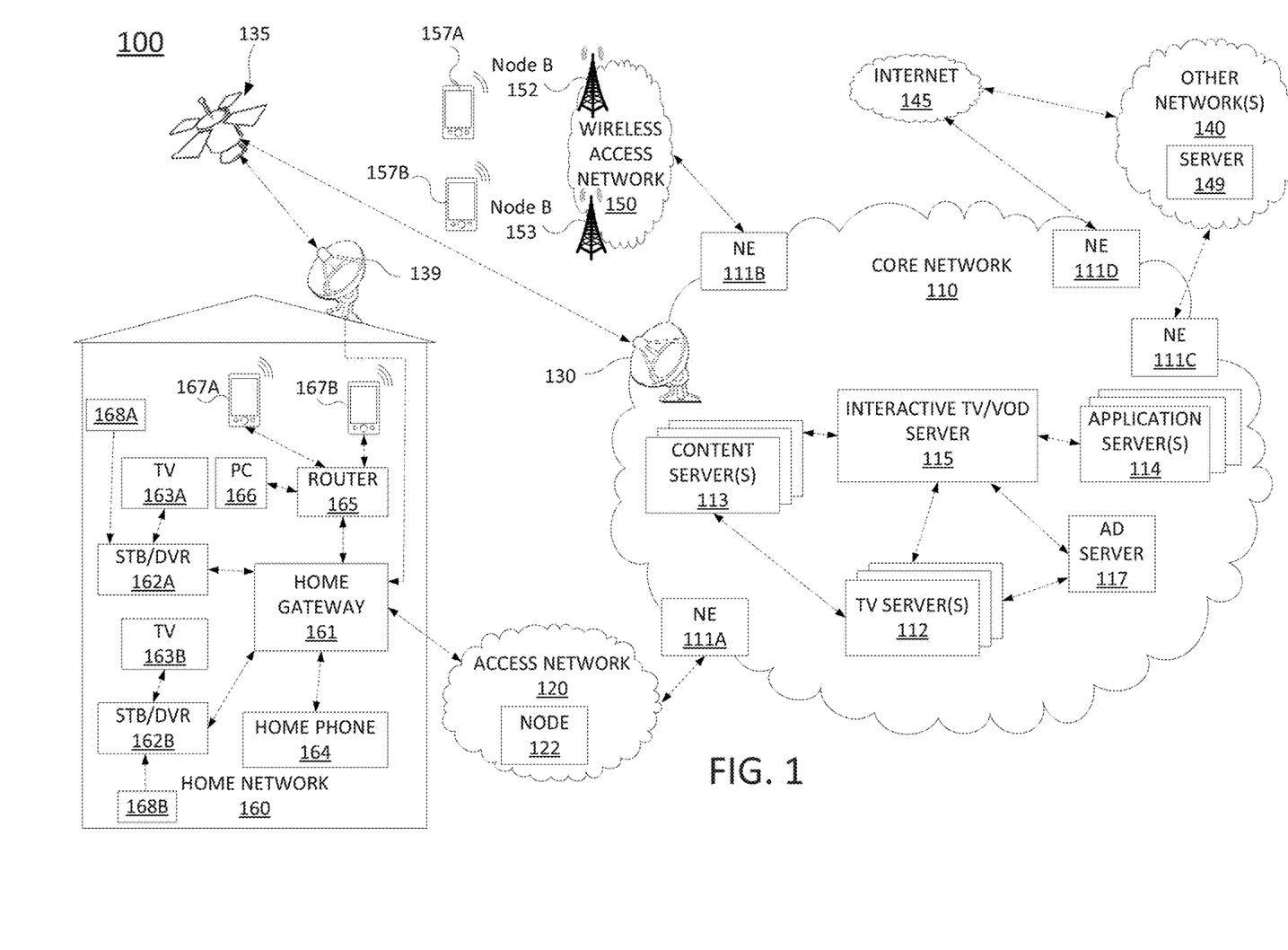
FIG. 1 illustrates an example network related to the present disclosure.

To better understand the present disclosure, FIG. 1 illustrates an example network 100 in which examples of the present disclosure for encoding a scene in a video program using an encoding strategy that is selected in accordance with a theme that is identified in the scene may operate. As shown in FIG. 1, the network 100 connects mobile devices 157A, 157B, 167A and 167B, and home network devices (e.g., customer premises-based devices) such as home gateway 161, set-top boxes (STBs) 162A, and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140 and/or the Internet 145.

In one embodiment, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology. While the present disclosure is not limited to any particular type of wireless access network, in the illustrative embodiment, wireless access network 150 is shown as a UMTS terrestrial radio access network (UTRAN) subsystem. Thus, elements 152 and 153 may each comprise a Node B or evolved Node B (eNodeB).

In one embodiment, each of the mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one embodiment, any one or more of the mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple-play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, and an interactive TV/VoD server 115 (e.g., an application server). For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may interact with content servers 113, advertising server 117, and interactive TV/VoD server 115 to select which video programs, or other content and advertisements to provide to the home network 160 and to others.

In one example, content servers 113 may store scheduled television broadcast video programs for a number of television channels, video-on-demand programming, local programming content, and so forth. For example, content providers may upload various video programs to the core network to be distributed to various subscribers. Alternatively, or in addition, content providers may stream various video programs to the core network for distribution to various subscribers, e.g., for live content, such as news programming, sporting events, and the like. In one example, advertising server 117 stores a number of advertisements that can be selected for presentation to viewers, e.g., in the home network 160 and at other downstream viewing locations. For example, advertisers may upload various advertising content to the core network 110 to be distributed to various customer premises.

As illustrated in FIG. 1, core network 110 may include various application servers 114. For instance, application servers 114 may be implemented to provide certain functions or features, e.g., a Serving—Call Session Control Function (S-CSCF), a Proxy—Call Session Control Function (P-CSCF), or an Interrogating—Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like. Application servers 114 may further include business information database (BID) storage servers. For instance, the network operator of core network 110 may receive and store third-party information relating to subscribers.

In one example, application servers 114 may include a network-based DVR server, or "cloud" DVR server, which may provide storage space for users to record, store, and playback video programming as an alternative to, or in addition to a customer premises-based DVR. It should be noted that the foregoing are only several examples of the types of relevant application servers 114 that may be included in core network 110 for storing information relevant to providing personalized content to a subscriber.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD), or the like. However, in another embodiment node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data (e.g., from TV servers 112, interactive TV/VoD server 115, application servers 114, etc.) is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions are a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections. In addition, although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

In one example, one or both of the STB/DVR 162A and STB/DVR 162B may host an operating system for presenting a user interface via TVs 163A and 163B, respectively. In one example, the user interface may be controlled by a user via a remote control 168A or 168B or other control devices which are capable of providing input signals to a STB/DVR. In one example, the user interface may comprise a plurality of windows and/or menus which may be navigated by making various selections via inputs from a remote control 168A or 168B, or other control devices. For instance, one or more windows and/or menus may provide a programming guide that lists channels and the programming that is playing or is scheduled to play on such channels. Channels and/or video programs listed in the programming guide may be selected to provide more detailed information regarding the channel and/or the program(s), such as cast and crew information, original air date information, rating information, upcoming show times, e.g., for repeat broadcasts of the same video program, and so forth. Channels and/or video programs may also be selected via the user interface upon which the STB/DVR 162A and/or STB/DVR 162B may tune to the channel that is selected, or tune to the channel of the video program that is selected.

Another user interface screen may provide a menu of available selections for video-on-demand (VoD) video programs, such as listings by content provider/television channel, by category or content type, and so forth. In one example, the selections for video-on-demand (VoD) video programs may be obtained by STB/DVR 162A and/or STB/DVR 162B from interactive TV/VoD server 115. Another screen may provide a listing of available DVR video programs that is stored in the STB/DVR 162A and/or STB/DVR 162B, and/or within a cloud DVR server, e.g., one of the application servers 114, and may provide various options that may be selected to playback recorded video programs, to delete recorded video programs, and so forth. In one example, STB/DVR 162A and/or STB/DVR 162B may also provide a web browser for obtaining video programs from servers hosting such video programs, and for making such video programs available via the Internet 145. For instance, in one example, server 149 in other networks 140 may represent such a web server. In one example, the web browser may comprise a limited web browser that is restricted to accessing certain approved web sites providing video programs. Thus, STB/DVR 162A and/or STB/DVR 162B may present video programs that are stored locally (e.g., DVR video programs from STB/DVR 162A and/or STB/DVR 162B), or which may be received via a network, e.g., VoD programs, video programs recorded in a cloud DVR, web based video programs, e.g., Moving Picture Expert Group (MPEG) .mpeg files, .mov files, .mp4 files, or the like, IPTV video programs, and so forth.

In general, the user interface may be presented via one of the STB/DVR 162A or STB/DVR 162B, one of the STB/DVR 162A or STB/DVR 162B in conjunction with one or more network-based devices, such as one or more of TV servers 112, interactive TV/VoD server 115, application servers 114 functioning as a cloud DVR server, etc. In addition, in one example, aspects of a user interface described in connection with STB/DVR 162A and STB/DVR 162B may also be provided via TVs 163A and 163B, e.g., when TV 163A and TV 163B are smart TVs.

Figure 4:
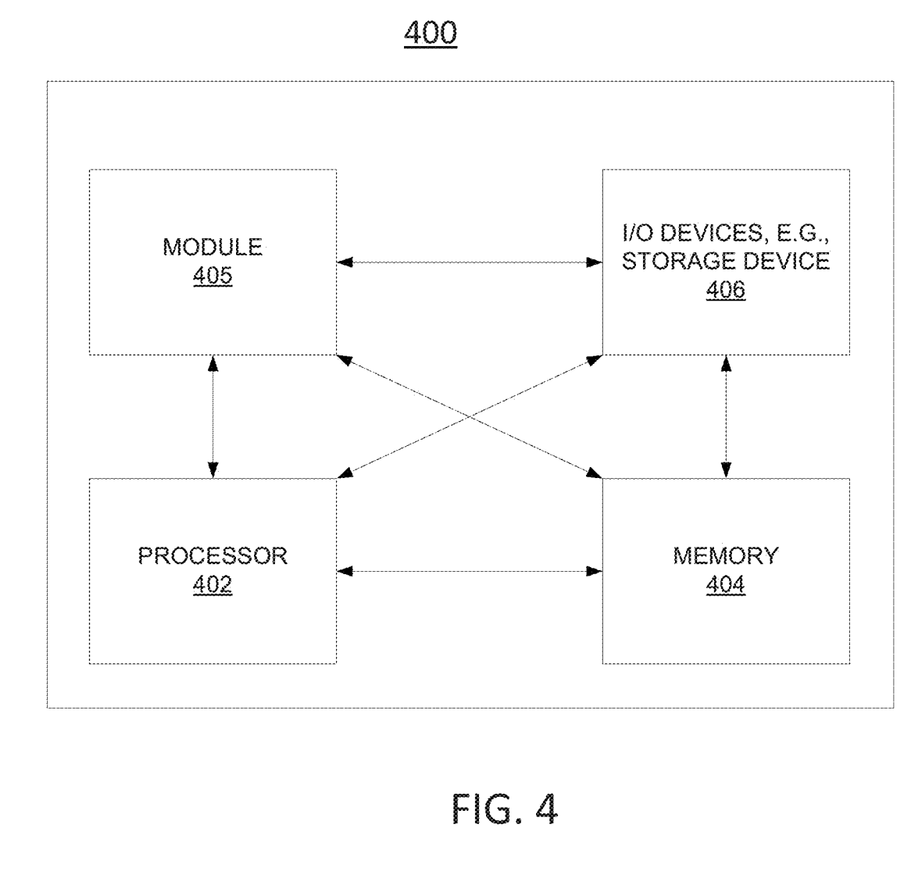
FIG. 4 illustrates a high level block diagram of a computing device specifically programmed to perform the steps, functions, blocks and/or operations described herein.

In accordance with the present disclosure, one or more of the application servers 114 may comprise a computing system or server, such as computing system 400 depicted in FIG. 4, and may be configured to provide one or more operations or functions for encoding a scene in a video program using an encoding strategy that is selected in accordance with a theme that is identified in the scene, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

To illustrate, one of the application servers 114 may store or receive video programs in accordance with the present disclosure, detect scene boundaries, identify themes in scenes, encode scenes using encoding strategies based upon the themes that are detected, and so forth. The video programs may be received in a raw/native format from server 149, or from another device within or external to core network 110. For instance, server 149 may comprise a server of a television or video programming provider. After encoding/compression, one of the application servers 114 may store the encoded version of the video program to one or more of the content servers 113 for later broadcasting via TV servers 112, streaming via interactive TV/VOD server 115, and so forth. In another example, the video programs may be received in a raw/native format from content servers 113 and stored back to content servers 113 after encoding. In still another example, the video program may be received from server 149 and stored back to server 149 after encoding. In addition, in some examples, one of application server 114 may also be configured to generate multiple target bitrate copies of the same video program, e.g., for adaptive bitrate streaming, for a selection of a different version of the video program depending upon the target platform or delivery mode (e.g., STB/DVR 162A and TV 163A via access network 120 versus mobile device 157B via wireless access network 150). Thus, multiple copies of the video program may be stored at server 149 and/or content servers 113.

Advantageously, an encoded version of the video program in accordance with the present disclosure may provide a same video quality as the video program in the raw/native format, while reducing the data volume, and hence the streaming rate via whichever transmission medium that is used to deliver the video program to a subscriber, or subscribers. For instance, multiple subscribers may stream different high definition videos from core network 110 via access network 120. Utilizing encoded video programs in accordance with the present disclosure, the likelihood of congestion and blocking in access network 120 is reduced, as well as the likelihood of rebuffering at the video players of the respective subscribers, such as at STB/DVR 162A, for example.

In addition, those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, server 149 may comprise a computing system or server, such as computing system 400 depicted in FIG. 4, and may be configured to provide one or more operations or functions for encoding a scene in a video program using an encoding strategy that is selected in accordance with a theme that is identified in the scene, as described herein. For instance, server 149 may store or receive video programs in accordance with the present disclosure, detect scene boundaries, identify themes in scenes, encode scenes using encoding strategies based upon the themes that are detected, and so forth. Server 149 may then provide encoded/compressed video programs to core network 110 for storage, and/or for broadcasting or streaming to subscriber devices via content servers 113, interactive TV/VOD server 115, TV servers 112, etc. In another example, server 149 may comprise a web server for providing video programs to client devices, such as a Dynamic Adaptive Streaming over HTTP (DASH) video server, or the like. Thus, server 149 may store video programs that are compressed/encoded in accordance with examples of the present disclosure. In one example, portions of core network 110 and/or other networks 140 may comprise a content distribution network (CDN) having ingest servers, edge servers, and the like for packet-based streaming of video programs. For instance, server 140, content servers 113, and/or NEs 111A-111D, may be configured to perform functions of CDN network components and collectively provide video programs that are encoded in accordance with the present disclosure to subscriber devices. Thus, these and other modifications are all contemplated within the scope of the present disclosure.

Figure 2:
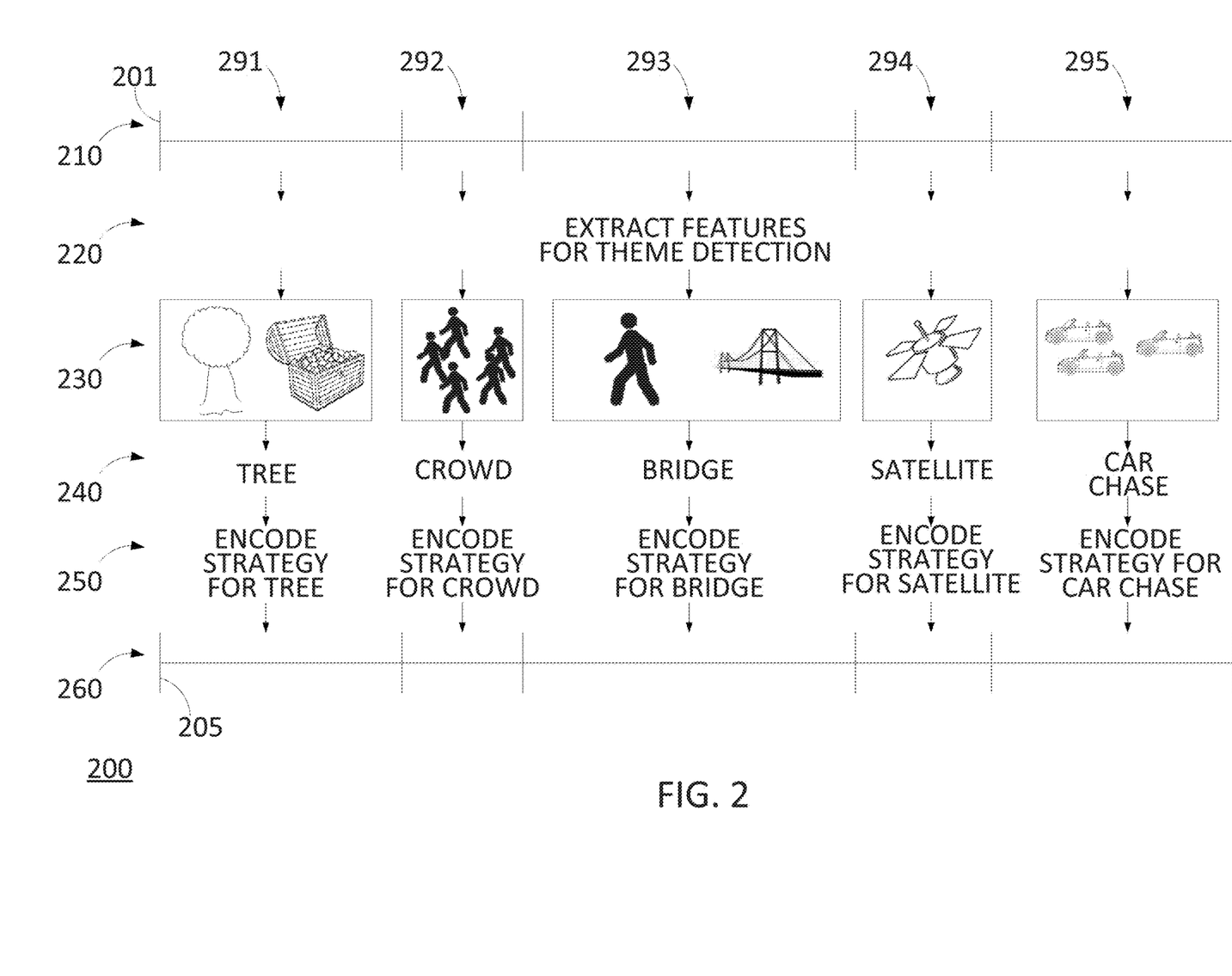
FIG. 2 illustrates an example process in accordance with the present disclosure.

FIG. 2 illustrates an example process 200 in accordance with examples of the present disclosure for encoding a scene in a video program using an encoding strategy that is selected in accordance with a theme that is identified in the scene. As illustrated in FIG. 2, the process 200 may start with a video program 201 comprising a number of scenes 291-295 (FIG. 2 illustrates a high-level representation of the video program 201 in a timeline form). At stage 210, the scene boundaries of scenes 291-295 may be detected using a shot detection program and/or a scene detection program. At stage 220, various features that may be used for one or more theme classifiers may be extracted from the scenes 291-295, such as low-level invariant image data including colors, shapes, color moments, color histograms, edge distribution histograms, etc., words and phrases identified in an audio portion, captioned text, and so forth.

At stage 230, different concepts within the respective scenes 291-295 may be identified. It should be noted that for some scenes, multiple themes may be detected. For instance, scene 291 may be determined to include the themes of "tree" and "treasure chest." Similarly, scene 293 may be determined to include the themes of "person" and "bridge." At stage 240, the primary theme of a scene may be identified. For some scenes, such as scenes 292, 294, and 295, if only one theme is identified, the single theme may comprise the primary theme. For other scenes, such as scenes 291 and 293, a primary theme may be selected from several themes that are identified. For example, it may be determined that the primary theme of scene 291 is "tree," while the primary theme of scene 293 is "bridge." As mentioned above, in one example, the primary theme may be identified using a maximal likelihood ranking of different themes, by using distance-based metrics, such as a distance from a hyperplane of a SVM for each of the respective themes, and so forth. At stage 250, an encoding strategy for each of the scenes 291-295 may be selected based upon the primary theme that is identified, and applied to each of the respective scenes 291-295 to generate an encoded version of the video program 205, which is indicated at stage 260.

Figure 3:
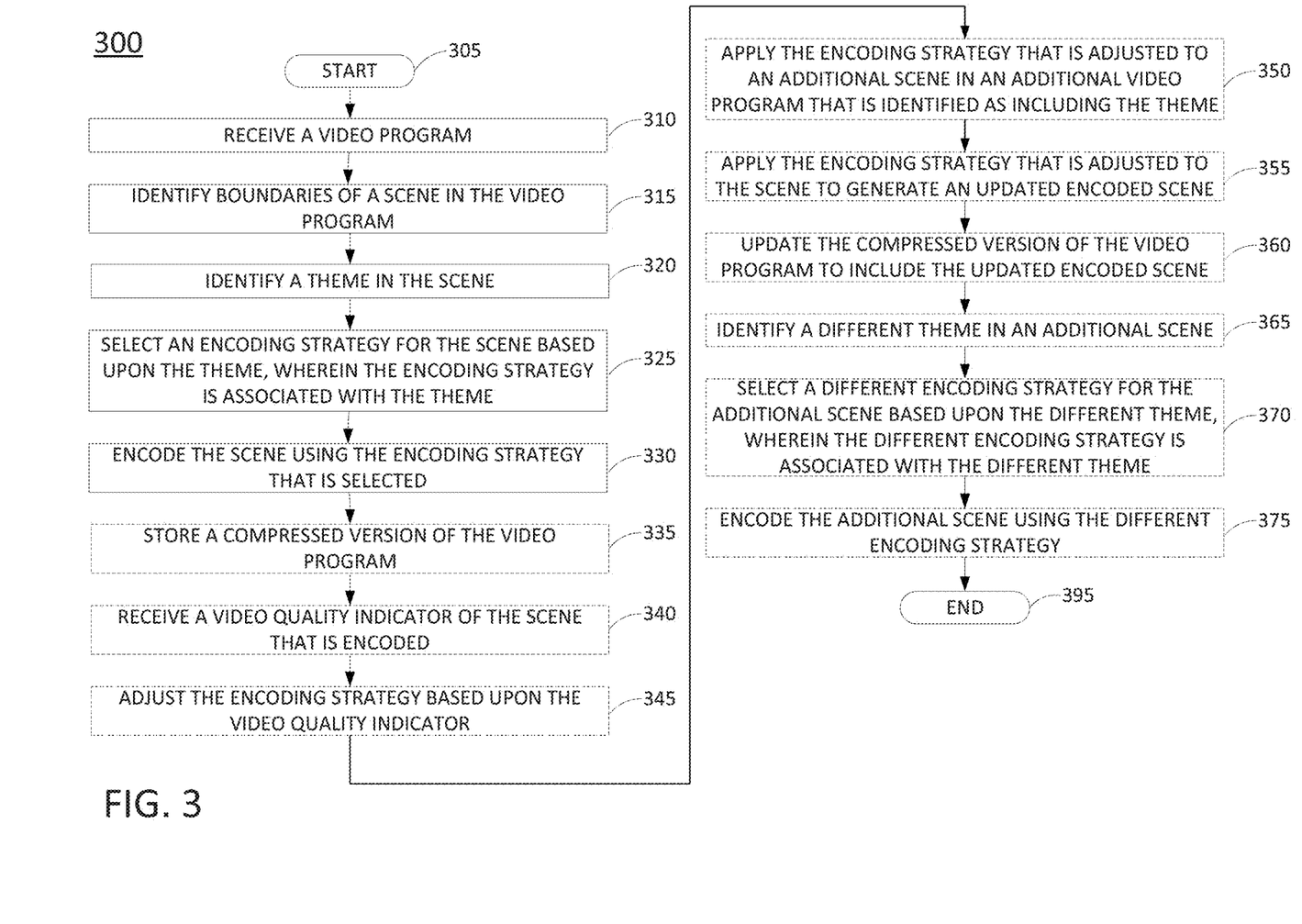
FIG. 3 illustrates a flowchart of an example method for encoding a scene in a video program using an encoding strategy that is selected in accordance with a theme that is identified in the scene.

FIG. 3 illustrates a flowchart of an example method 300 for encoding a scene in a video program using an encoding strategy that is selected in accordance with a theme that is identified in the scene, in accordance with the present disclosure. In one example, the method 300 is performed by a component of the network 100 of FIG. 1, such as by one of the application servers 114 and/or any one or more components thereof (e.g., a processor, or processors, performing operations stored in and loaded from a memory), or by one of the application servers 114 in conjunction with one or more other devices, such as content servers 113, interactive TV/VOD server 115, server 149, and so forth. In one example, the steps, functions, or operations of method 300 may be performed by a computing device or system 400, and/or processor 402 as described in connection with FIG. 4 below. For instance, the computing device or system 400 may represent any one or more components of an application server 114 in FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processor, such as processor 402. The method 300 begins in step 305 and proceeds to step 310.

At step 310, the processor receives a video program. For example, the video program may be received from a variety of sources, such as from a content server of a television service provider, from a content distribution network (CDN), from a server of a television or video programming provider, and so forth.

At step 315, the processor identifies boundaries of a scene in the video program. In one example, the scene comprises one or more shots. In one example, the identifying of the boundaries of the scene comprises detecting shot boundaries of shots in the video program and determining a plurality of the shots that belongs to the scene. In one example, the shot boundaries are detected in accordance with a shot boundary detection program. In one example, the plurality of the shots is determined to belong to the scene in accordance with a shot aggregation scene detection program. For instance, the processor may perform instructions in accordance with a shot detection program and/or a shot aggregation scene detection program which may utilize various features from the video program, and frames in the video program, to delineate scene and/or shot boundaries, such as: color histogram differences or a change in color distribution, edge change ratios, standard deviation of pixel intensities, contrast, average brightness, and the like, to identify hard cuts, fades, dissolves, etc., which may indicate the end of a shot and the beginning of another shot. In one example, a shot aggregation scene detection program that is deployed in accordance with the present disclosure may utilize audio and/or text caption data to relate shots together into a scene.

At step 320, the processor identifies a theme in the scene. In one example, the theme comprises a concept selected from a lexical database. For instance, the theme may comprise a type of object, a site (or location), a scene type, people, an event, or an activity. In one example, the theme that is identified comprises a primary theme identified from a number of themes in the scene. In one example, step 320 may include the processor extracting various data points from the scene (e.g., from frames of the scene, from inter-frame information, and so forth), such as low-level invariant image data including colors, shapes, color moments, color histograms, edge distribution histograms, etc., words and phrases identified in an audio portion, captioned text, and so forth, and processing the data points via a classifier, such as a single class SVM, a multi-class SVM based classifier, a neural network or other non-SVM based classifier, and so forth, to determine one or more themes in the scene. The primary theme may be a theme with a maximal likelihood score of a classifier (e.g., with a score that is higher than the score(s) for other themes that may be identified in the scene).

At step 325, the processor selects an encoding strategy for the scene based upon the theme, wherein the encoding strategy is associated with the theme. In one example, the encoding strategy comprises a plurality of parameters of a compression algorithm. In various examples, the compression algorithm may be in accordance with ITU-T H.264, H.263, H.261, MPEG-4, MPEG-2, H.265 HEVC, or the like. Accordingly, the plurality of parameters may include an image salience factor, a color quantization factor (such as a number of luminance and/or chrominance sampling values), a motion estimation factor, a rate-distortion factor, and the like. In one example, the scenes may be encoded for multiple target bitrates. As such, examples of the present disclosure may maintain multiple encoding strategies per theme (e.g., one set of encoding parameters for each target bitrate) that may be selected at step 325.

At step 330, the processor encodes the scene using the encoding strategy that is selected. For instance, step 330 may comprise application of a compression algorithm to the scene with the parameters selected at step 325. In one example, the processor may select a target bitrate based upon a variety of factors related to the intended target platform or mode of delivery, such as: a maximum processor speed, a memory capacity, or a maximum screen resolution, network conditions, such as latency, bandwidth, throughput, etc., access rights to the video program, an overall length of the video program, and so forth.

At optional step 335, the processor may store a compressed or encoded version of the video program that includes the scene that is encoded. Notably, an encoded or compressed version of the video program in accordance with the present disclosure may provide a same or substantially the same video quality as the video program in the raw/native format. Step 335 may comprise storing the encoded or compressed version of the video program at a same device as the processor or at one or more additional devices via a local connection or via a network connection. For instance, the encoded or compressed version of the video program may be stored at one or more content servers of a television service provider network, at a web server for streaming video, and so on.

At optional step 340, the processor may receive a video quality indicator of the scene that is encoded. In one example, the video quality indicator is generated in accordance with an automated video quality assessment. In one example, the automated video quality assessment is provided via the processor. In another example, the automated video quality assessment is provided via another device, where the video quality indicator is received by the processor from the other device. In another example, the video quality indicator is generated in accordance with a mean opinion score (MOS). In still another example, the video quality indicator is generated in accordance with both an automated video quality assessment and a MOS.

At optional step 345, the processor may adjust the encoding strategy based upon the video quality indicator. For instance, when the video quality indicator of the scene indicates a negative perception of a video quality of the scene, the adjusting the encoding strategy may include: increasing an image salience factor, increasing a color quantization factor, e.g., by providing for more colors to represent regions of a frame of a video, decreasing a motion estimation factor to provide for a greater decoupling between frames of a video, increasing a rate-distortion factor, e.g., by allocating a greater number of bits to represent a plurality of frames of a video, and so forth. In one example, a "negative" perception of a video quality may be determined by setting a threshold for the video quality indicator that is received at step 340, with respect to whichever scale is used for the video quality indicator. Thus, the encoding strategy for the theme may be optimized based upon feedback comprising the video quality indicator.

At optional step 350, the processor may apply the encoding strategy that is adjusted to an additional scene in an additional video program that is identified as including the theme. In one example, the additional scene is a scene in a different video program. In another example, the additional scene is a scene in the same video program. In one example, step 350 may include: identifying the theme in the additional scene, selecting the encoding strategy for the additional scene based upon the theme, and encoding, the additional scene using the encoding strategy that is adjusted.

At optional step 355, the processor may apply the encoding strategy that is adjusted to the scene to generate an updated encoded scene. For instance, optional step 355 may comprise the same or similar operations as step 330, however, using different parameters of the encoding strategy that have been adjusted.

At optional step 360, the processor may update the encoded or compressed version of the video program to include the updated encoded scene. In particular, the updated encoded scene may replace the scene that is encoded at step 330 and stored in the encoded or compressed version of the video program at optional step 335. In one example, optional step 360 may comprise sending the updated encoded scene and an instruction to another device on which the encoded or compressed version of the video program is stored to make the replacement.

At optional step 365, the processor may identify a different theme in an additional scene. In one example, the additional scene is a scene in a different video program. In another example, the additional scene is a scene in the same video program. Optional step 365 may comprise the same or similar operations as step 320. However, the processor may identify a different theme in the additional scene as a result of a different content.

At optional step 370, the processor may select a different encoding strategy for the additional scene based upon the different theme. For instance, as described above, each theme may have at least one encoding strategy. Thus, the different encoding strategy that is selected at optional step 370 is associated with the different theme.

At optional step 375, the processor may encode the additional scene using the different encoding strategy. For instance, optional step 375 may comprise the same or similar operations as step 330, however, with respect to the additional scene and utilizing the different encoding strategy that may be selected at optional step 370.

Following step 330, or one of the optional steps 335-375, the method 300 proceeds to step 395 where the method ends.

It should be noted that the method 300 may be expanded to include additional steps, or may be modified to replace steps with different steps, to combine steps, to omit steps, to perform steps in a different order, and so forth. For instance, in one example the processor may repeat one or more steps of the method 300 by identifying scene boundaries, identifying themes, selecting encoding strategies, and applying the encoding strategies to further scenes of the video program. In another example, the method 300 may be expanded to include receiving an additional video quality indicator of the additional scene that is encoded at optional step 375, and adjusting the additional encoding strategy based upon the additional video quality indicator. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 or described in connection with the method 300 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for encoding a scene in a video program using an encoding strategy that is selected in accordance with a theme that is identified in the scene, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for encoding a scene in a video program using an encoding strategy that is selected in accordance with a theme that is identified in the scene (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for encoding a scene in a video program using an encoding strategy that is selected in accordance with a theme that is identified in the scene (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   receiving, by a processing system, a video program;
   identifying, by the processing system, boundaries of a scene in the video program;
   identifying, by the processing system, a theme in the scene, wherein the theme comprises a concept selected from a lexical database, wherein the lexical database defines themes comprising: different types of objects, different sites, different types of people, different events, and different activities;
   selecting, by the processing system, an encoding strategy for the scene based upon the theme and a target bitrate, wherein the encoding strategy is associated with the theme, wherein for each of a plurality of themes, the processing system maintains a plurality of encoding strategies associated with different target bitrates, wherein the plurality of themes includes the theme;
   encoding, by the processing system, the scene using the encoding strategy that is selected;
   receiving, by the processing system, a video quality indicator of the scene that is encoded; and
   adjusting, by the processing system based upon the video quality indicator, the encoding strategy that is associated with the theme as maintained by the processing system, wherein the encoding strategy is adjusted when the video quality indicator falls below a video quality indicator threshold, wherein for each of the plurality of themes, the processing system maintains a plurality of video quality indicator thresholds, wherein each of the plurality of video quality indicator thresholds is for adjusting a different one of the plurality of encoding strategies.

2. The method of claim 1, further comprising:
   storing an encoded version of the video program, wherein the encoded version of the video program comprises the scene that is encoded.

3. The method of claim 2, further comprising:
   applying the encoding strategy that is adjusted to the scene to generate an updated encoded scene; and
   updating the encoded version of the video program to include the updated encoded scene, wherein the updated encoded scene replaces the scene that is encoded in the encoded version of the video program.

4. The method of claim 1, wherein the video quality indicator is generated in accordance with an automated video quality assessment.

5. The method of claim 1, wherein the video quality indicator is generated in accordance with a mean opinion score.

6. The method of claim 1, further comprising:
applying the encoding strategy that is adjusted to an additional scene that is identified as including the theme.

7. The method of claim 1, wherein the encoding strategy comprises a plurality of parameters of a compression algorithm.

8. The method of claim 7, wherein the plurality of parameters includes at least one of:
an image salience factor;
a color quantization factor;
a motion estimation factor; or
a rate-distortion factor.

9. The method of claim 8, wherein, when the video quality indicator of the scene indicates a negative perception of a video quality of the scene, the adjusting the encoding strategy comprises at least one of:
increasing the image salience factor;
increasing the color quantization factor, wherein the increasing the color quantization factor comprises providing for one or more colors to represent regions of a frame of the video program;
decreasing the motion estimation factor, wherein the decreasing the motion estimation factor provides for a greater decoupling between frames of the video program; or
increasing the rate-distortion factor, wherein the increasing the rate-distortion factor allocates a greater number of bits to represent a plurality of frames of the video program.

10. The method of claim 1, further comprising:
identifying a different theme in an additional scene of the video program;
selecting a different encoding strategy for the additional scene based upon the different theme, wherein the different encoding strategy is associated with the different theme; and
encoding the additional scene using the different encoding strategy.

11. The method of claim 1, wherein the theme comprises:
a type of object;
a site;
a type of people;
an event; or
an activity.

12. The method of claim 1, wherein the theme that is identified comprises a primary theme identified from a number of themes in the scene.

13. The method of claim 1, wherein the scene comprises a plurality of shots.

14. The method of claim 1, wherein the identifying the boundaries of the scene comprises:
detecting shot boundaries of a plurality of shots in the video program; and
determining one or more of the plurality of the shots that belong to the scene.

15. The method of claim 14, wherein the shot boundaries are detected in accordance with a shot boundary detection program.

16. The method of claim 14, wherein the one or more of the plurality of the shots are determined to belong to the scene in accordance with a shot aggregation scene detection program.

17. A non-transitory computer-readable medium storing instructions which, when executed by a processing system, cause the processing system to perform operations, the operations comprising:
receiving a video program;
identifying boundaries of a scene in the video program;
identifying a theme in the scene, wherein the theme comprises a concept selected from a lexical database, wherein the lexical database defines themes comprising: different types of objects, different sites, different types of people, different events, and different activities;
selecting an encoding strategy for the scene based upon the theme and a target bitrate, wherein the encoding strategy is associated with the theme, wherein for each of a plurality of themes, the processing system maintains a plurality of encoding strategies associated with different target bitrates, wherein the plurality of themes includes the theme;
encoding the scene using the encoding strategy that is selected;
receiving a video quality indicator of the scene that is encoded; and
adjusting, based upon the video quality indicator, the encoding strategy that is associated with the theme as maintained by the processing system, wherein the encoding strategy is adjusted when the video quality indicator falls below a video quality indicator threshold, wherein for each of the plurality of themes, the processing system maintains a plurality of video quality indicator thresholds, wherein each of the plurality of video quality indicator thresholds is for adjusting a different one of the plurality of encoding strategies.

18. A device comprising:
a processing system; and
a computer-readable medium storing instructions which, when executed by the processing system, cause the processing system to perform operations, the operations comprising:
receiving a video program;
identifying boundaries of a scene in the video program;
identifying a theme in the scene, wherein the theme comprises a concept selected from a lexical database, wherein the lexical database defines themes comprising: different types of objects, different sites, different types of people, different events, and different activities;
selecting an encoding strategy for the scene based upon the theme and a target bitrate, wherein the encoding strategy is associated with the theme, wherein for each of a plurality of themes, the processing system maintains a plurality of encoding strategies associated with different target bitrates, wherein the plurality of themes includes the theme;
encoding the scene using the encoding strategy that is selected;
receiving a video quality indicator of the scene that is encoded; and
adjusting, based upon the video quality indicator, the encoding strategy that is associated with the theme as maintained by the processing system, wherein the encoding strategy is adjusted when the video quality indicator falls below a video quality indicator threshold, wherein for each of the plurality of themes, the processing system maintains a plurality of video quality indicator thresholds, wherein each of the plurality of video quality indicator thresholds is for adjusting a different one of the plurality of encoding strategies.

19. The device of claim 18, the operations further comprising:

identifying a different theme in an additional scene of the video program;

selecting a different encoding strategy for the additional scene based upon the different theme, wherein the different encoding strategy is associated with the different theme; and encoding the additional scene using the different encoding strategy.

20. The device of claim 18, wherein the video quality indicator is generated in accordance with an automated video quality assessment.

* * * * *